Patented Mar. 9, 1954

2,671,775

UNITED STATES PATENT OFFICE 2,671,775

TRISAZO DYESTUFFS

Walter Hanhart, Riehen, Switzerland, assignor to Ciba Limited, Basel, Switzerland, a Swiss firm No Drawing. Application June 11, 1951, Serial No. 231,059

Claims priority, application Switzerland June 22, 1950

11 Claims. (Cl. 260—155)

According to this invention valuable new trisazo-dyestuffs are made by coupling a diazo-disazo-compound of an amine of the general formula $$R_1—N=N—R_2—N=N—R_3—NH_2$$

in which $R_1$ represents a heterocyclic radical containing a 5-membered heterocyclic-ring, which contains at least two hetero-atoms of which at least one is a nitrogen atom bound exclusively in the ring, $R_2$ represents the radical of a middle component of the benzene or naphthalene series, advantageously one which contains bound in a position vicinal to the azo group connecting $R_2$ and $R_3$ a group capable of taking part in the formation of metal complexes, and $R_3$ represents the radical of a 5-hydroxynaphthalene-7-sulfonic acid bound in the 6-position to the azo group and which is bound in at least one of the positions 1 and 2 directly or advantageously through a bridge member to the diazotizable —$NH_2$ group, with an azo component which is itself capable of forming complex metal compounds.

The amino-disazo-dyestuffs of the above formula can be made by coupling a diazo compound of an amine of the formula $R_1$—$NH_2$ with a middle component of the constitution H—$R_2$—$NH_2$, further diazotizing the resulting amino-monoazo-dyestuff, and coupling the diazo compound in an alkaline medium with a compound of the formula H—$R_3$—$NH_2$. In the foregoing formulae $R_1$, $R_2$ and $R_3$ have the meanings given in the preceding paragraph.

The initial component of the formula $R_1$—$NH_2$ serving as starting material contains a 5-membered heterocyclic ring, to which the —$NH_2$ group may be bound directly; the latter group may also be bound to an aromatic ring, for example, a benzene ring, which is either linked to the said heterocyclic ring by a simple direct bond or fused thereto (that is to say, in the latter case two carbon atoms of the aromatic ring also form part of the heterocyclic ring). The heterocyclic ring contains at least two heteroatoms of which at least one is a nitrogen atom bound exclusively in the ring, thus a nitrogen atom of which all the three valencies are saturated in forming the ring. The manufacture of the dyestuffs of the present invention is in other respects facilitated by starting from initial components which are free from hydroxyl groups imparting coupling properties thereto.

Valuable results are obtained, for example, with initial components of the formula $R_1$—$NH_2$, in which the amino group is bound to a benzene ring of which two vicinal ring carbon atoms also form part of a 5-membered heterocyclic ring containing at least two nitrogen atoms, and at least one of which nitrogen atoms is bound exclusively in the ring.

The initial components may contain in addition to the hetero-ring and the benzene ring fused thereto at the most one further benzene ring which may be fused to the first mentioned benzene ring (thus forming a naphthalene ring) or which may be linked directly by a single bond to the hetero ring.

As examples of suitable initial components the following compounds may be mentioned:

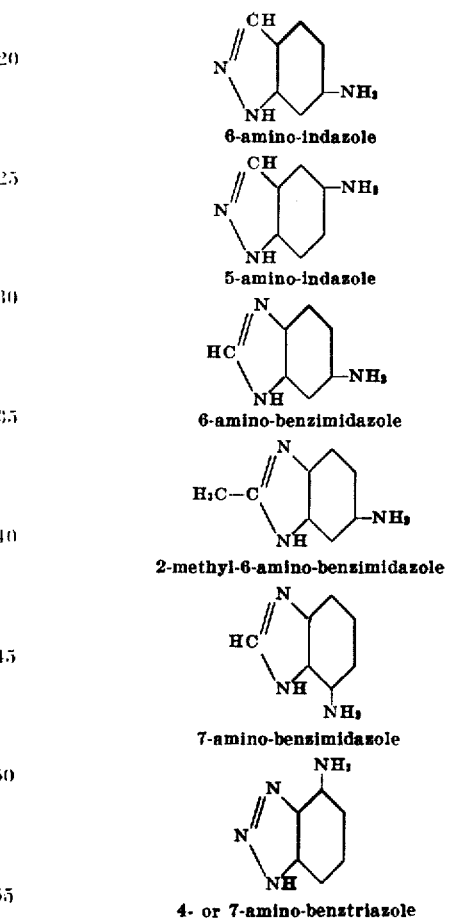

6-amino-indazole 5-amino-indazole 6-amino-benzimidazole 2-methyl-6-amino-benzimidazole 7-amino-benzimidazole 4- or 7-amino-benztriazole

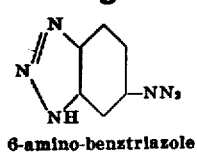
6-amino-benztriazole

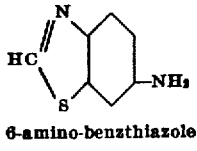
6-amino-benzthiazole and also the compounds of the formulae

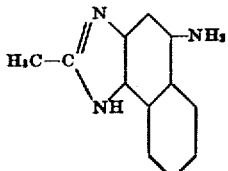

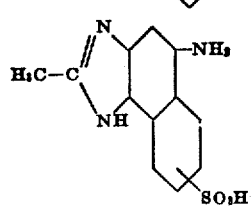

(subsequently sulfonated, the position of the sulfonic acid group being uncertain)

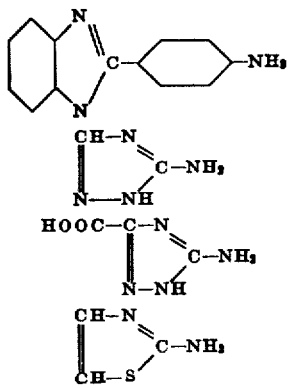

The amines of the formula H—$R_2$—$NH_2$ serving as middle components for making the aminodisazo dyestuffs of the foregoing formula may belong, for example, to the naphthalene or advantageously the benzene series. The substituent which is capable of taking part in the formation of metal complexes, may, for example, be a hydroxyl group, a carboxylic acid group, an —O—$CH_2$—COOH group or more especially an alkoxy group; as alkoxy groups there are especially suitable ethoxy groups and above all methoxy groups. As middle components there come into consideration, for example, the following compounds:

Aminobenzene,
1-amino-3-methylbenzene,
1-aminonapthalene,
1-amino-2-methoxynaphthalene,
1-amino-2-methoxynaphthalene-6- or 7-sulfonic acid,
1-amino-2-carboxymethoxy-naphthalene,
1-amino-2-methoxy- or -2-ethoxybenzene,
1-amino-2-methoxy- or -2-ethoxy-5-methylbenzene,
1-amino-2:5-dimethoxy- or -2:5-diethoxybenzene,
1-amino-2-ethoxy-5-methoxybenzene,
1-amino-2-methoxy-5-ethoxybenzene,
1-amino-2-propyloxy-5-methoxybenzene,
1-amino-2-carboxymethoxy-5-methylbenzene,
1-amino-2-hydroxy-5-methylbenzene,
1-acetylamino - 2 - hydroxybenzene (the acetyl group being split off after coupling).

The azo-components of the formula

H—$R_3$—$NH_2$ are naphthalene derivatives which contain in the 5-position a hydroxyl group, in the 7-position a sulfonic acid group, and the diazotizable —$NH_2$ group bound either directly to the naphthalene nucleus in the 1- or 2-position or bound in at least one of the positions 1 and 2 by means of a bridge member. There may be used for example azo-components of the formula

[structure]

wherein one X stands for a hydrogen atom and the other X stands for an —$NH_2$-group or one of the radicals

[structure]

and

[structure]

furthermore 2-amino-5-hydroxynaphthalene-7-sulfonic acids containing a substituent in 1-position and also those derivatives of 2-amino-5-hydroxynaphthalene - 7 - sulfonic acid which are bound to the diazotizable —$NH_2$ group both in the 2-position and in the 1-position of the naphthalene nucleus that is to say bound by means of a ring fused to the naphthalene nucleus.

As compounds of the formula H—$R_3$—$NH_2$ which are suitable for the present process the following may be mentioned:

1-amino-5-hydroxynaphthalene-7-sulfonic acid,
2-amino-5-hydroxynaphthalene-7-sulfonic acid,
2-amino-5-hydroxynaphthalene - 1,7 - disulfonic acid,
1-chloro-2-amino- 5 -hydroxynaphthalene-7-sulfonic acid,
1-(4'-aminophenyl)-amino- 5 -hydroxynaphthalene-7:3'-disulfonic acid,
2-(4'-aminophenyl)-amino- 5 -hydroxynaphthalene-7-sulfonic acid,
2-(3'aminophenyl)-amino - 5 - hydroxynaphthalene-7-sulfonic acid,
2-(3'-aminobenzoyl) - amino-5-hydroxynaphthalene-7-sulfonic acid,
2-(4'-aminobenzoyl) - amino-5-hydroxynaphthalene-7-sulfonic acid,
1-(4'-aminobenzoyl) - amino-5-hydroxynaphthalene-7-sulfonic acid, the asymmetrical urea derivative of the formula

[structure]

and also those of the formulae

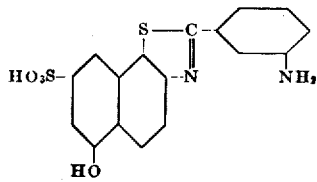

and

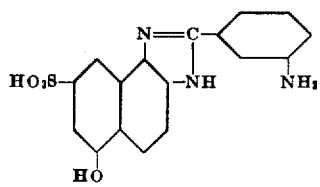

Especially valuable is 2-(4'-aminophenyl)-amino- 5 -hydroxynaphthalene - 7:3' - disulfonic acid of the formula

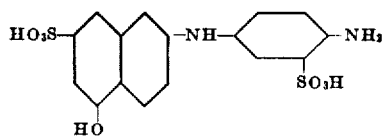

In making the amino-disazo-dyestuffs of the formula $R_1-N=N-R_2-N=N-R_3-NH_2$ in the manner described above, the coupling of the diazo compound of an amine of the formula $R_1-NH_2$ is generally carried out with advantage in a weakly acid, for example, an acetic acid, medium. If the middle component $H-R_2-NH_2$ has only a low coupling power it is generally of advantage to couple it in the form of its ω-methane sulfonic acid and subsequently to split off the methane sulfonic acid group. The diazotization of the amino-monoazo-dyestuff of the constitution $$R_1-N=N-R_2-NH_2$$

can be carried out by methods in themselves known, for example, by means of hydrochloric acid and sodium nitrite. The resulting diazo-monoazo-compound is coupled with an azo-component of the constitution $H-R_3-NH_2$ in an alkaline medium, for example, a medium rendered alkaline with an alkali carbonate.

In accordance with the process of the invention the diazo-disazo-compounds of the formula first mentioned above are coupled with azo-components which are themselves capable of forming complex metal compounds. For this purpose there come into consideration, for example, compounds which contain a salicylic acid grouping, provided that they are still capable of coupling with the particular diazo-disazo-compound used. 1-hydroxybenzene-2-carboxylic acid itself and substitution products thereof capable of coupling, such as 6-chloro- or 6-methyl-1-hydroxybenzene-2-carboxylic acid, can be coupled only with some of the diazo-disazo compounds used in the present process, advantageously those which contain in a position vicinal to the diazotized amino group no substituents rendering coupling difficult such as sulfonic acid groups.

Especially valuable azo components in this connection are 8-hydroxyquinolines, such, for example, as 8-hydroxyquinoline-7-sulfonic acid and above all 8-hydroxyquinoline itself.

The amino-disazo dyestuffs are advantageously diazotized by the so-called indirect method in which, for example, a solution or suspension which contains the amino-disazo-dyestuff in the form of an alkali salt and advantageously a slight excess of free alkali together with the necessary quantity of nitrite, is coupled in the presence of an excess of dilute hydrochloric acid.

The coupling of the amino-disazo-compound with the azo-components of the above kind is conducted with advantage in an alkaline medium, for example, a medium rendered alkaline with an alkali carbonate or an alkaline earth metal hydroxide, if desired with the addition of a substance favoring coupling, such as pyridine.

In general it is desirable so to select the starting materials that in all two sulfonic acid groups are present in the trisazo-dyestuff.

The new trisazo-dyestuffs of the invention correspond to the general formula $$R_1-N=N-R_2-N=N-R_3-N=N-R_4$$

in which $R_1$ represents a heterocyclic radical containing a 5-membered hetero-ring, which contains at least two hetero-atoms of which at least one is a nitrogen atom bound exclusively in the ring, $R_2$ represents the radical of a middle component of the benzene or naphthalene series, advantageously one which contains in a position vicinal to the azo group connecting $R_2$ and $R_3$ a group capable of taking part in the formation of metal complexes.

$R_3$ represents the radical of a 5-hydroxynaphthalene-7-sulfonic acid bound in the 6-position to the azo-group connecting $R_2$ and $R_3$, and which radical is bound in at least one of the positions 1 and 2 directly or advantageously by means of a bridge member to the azo group connecting $R_3$ and $R_4$, and $R_4$ represents the radical of an azo-component which is itself capable of forming metal complexes.

The dyestuffs of this invention are suitable for dyeing a very wide variety of materials, for example, animal fibers such as wool, silk and leather, and especially for dyeing or printing cellulose materials such as cotton, linen and artificial silk and staple fibers of regenerated cellulose. The dyestuffs are advantageously treated on the fiber or partially on the fiber and partially in the dyebath with agents yielding metal by known methods. It is of advantage, for example, to use the process of U. S. Patent No. 2,148,659, in which first the dyeing and then the treatment with an agent yielding metal are carried out in the same bath. As agents yielding metal there come into consideration more especially those which are stable towards alkaline solutions, such as complex copper tartrates and the like.

In some cases especially valuable dyeings are produced by working according to the process in which a dyeing or print produced with the metal-free dyestuff is after-treated with an aqueous solution containing a basic formaldehyde condensation product from a compound containing in the molecule at least once the atom grouping

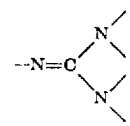

for example, dicyandiamide or dicyandiamidine, or a compound easily convertible into such a compound, for example, cyanamide, and which solution also contains a water-soluble, especially complex copper compound. Such processes are described, for example, in British Patent No. 619,969.

The following examples illustrate the invention, the parts and percentages being by weight:

Example 1

13.3 parts of 6-amino-indazole are dissolved in 300 parts of cold water and 45 parts of hydrochloric acid of 30 per cent strength, and after the addition of some ice diazotization is carried out by pouring in a solution of 7.6 parts of sodium nitrite in 35 parts of water. A small quantity of sulfaminic acid is added until the nitrite reaction disappears, and then coupling is carried out in a manner in itself known with 13.7 parts of 1-amino-2-methoxy-5-methylbenzene in an acetic acid medium while cooling with ice. When the coupling is finished, sufficient hydrochloric acid is added to produce an acid reaction to Congo, the completely precipitated monoazo-dyestuff is separated by filtration, and the latter is then stirred in a mixture of 1000 parts of water and 108 parts of sulfuric acid of 95 per cent strength and diazotized at 20° C. by the rapid addition of 10 parts of sodium nitrite in the form of a solution of 20 per cent strength. After 5-10 minutes the diazotization is finished, and the diazo monoazo-compound is completely dissolved. Coupling with 41 parts of 2-(4'-aminophenyl)-amino-5-hydroxynaphthalene-7:3'-disulfonic acid is then carried out while cooling with ice in a solution rendered alkaline with sodium carbonate. When the coupling is finished, the precipitated disazo-dyestuff is separated by filtration and washed on the filter with sodium chloride solution of 10 per cent strength until the coupling component can no longer be detected. The resulting disazo-dyestuff is dissolved in the warm in 1500 parts of water and 13.5 parts of sodium hydroxide solution of 30 per cent strength, the whole is cooled by the addition of ice to about 10° C., then mixed with 7 parts of sodium nitrite in the form of a solution of 20 per cent strength and diazotization is carried out by pouring in 58 parts of hydrochloric acid of 30 per cent strength which has been diluted with 150 parts of water. The diazo solution is stirred for a few hours while cooling with ice, the excess of nitrite is decomposed by means of sulfaminic acid, and there is added first a weakly hydrochloric acid solution of 14.5 parts of 8-hydroxyquinoline and then a solution of 60 parts of sodium carbonate in 250 parts of water. When the coupling is finished, the precipitated dyestuff which in its free acid state corresponds to the formula

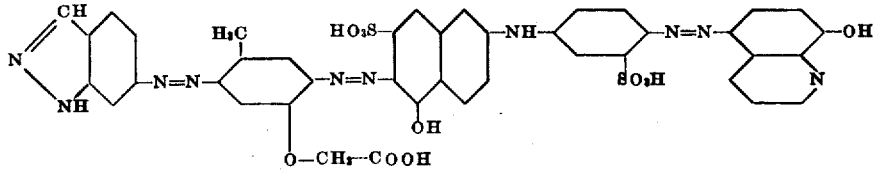

is separated by filtration and dried. It is a black powder which dissolves in concentrated sulfuric acid with a green-blue coloration and in water with a blue-violet coloration, and dyes cotton by the single bath or 2-bath after-coppering process navy blue tints which are fast to washing and light.

By using instead of the first coupling component a corresponding quantity of 1-amino-2-carboxy-methoxy-5-methylbenzene, there is obtained a similar dyestuff which dyes somewhat more greenish tints. In its free acid state this dyestuff corresponds to the formula

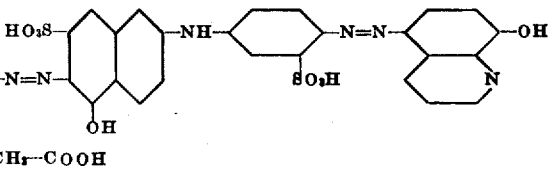

By using 1-amino-2:5-dimethoxybenzene the tint is shifted still further towards green, whereas 1-amino-3-methyl-benzene yields a dyestuff producing violet tints. By using as the initial component 5-amino-indazole, and otherwise working in accordance with the above example, a practically identical dyestuff is obtained. All the dyes are distinguished by their very good fastness to washing.

Example 2

14.7 parts of 2-methyl-6-amino-benzimidazole are dissolved in 100 parts of water and 25 parts of hydrochloric acid of 30 per cent strength, and after the addition of some ice diazotization is brought about by the rapid addition of 35 parts of a sodium nitrite solution of 20 per cent strength. The whole is stirred for a short time whilee cooling, any excess of nitrite is decomposed by means of sulfaminic acid, and coupling is carried out in known manner by means of a hydrochloric acid solution of 13.7 parts of 1-amino-2-methoxy-5-methylbenzene, the free hydrochloric acid being neutralized with sodium acetate. When the coupling is finished, the monoazo-dyestuff is separated by filtration and washed with a sodium chloride solution of 5 per cent strength acidified with a small quantity of hydrochloric acid, and then suspended in 350 parts of cold water. 22 parts of sodium hydroxide solution of 30 per cent strength are first added, and then 35 parts of a sodium nitrite solution of 20 per cent strength and some ice are added, and diazotization is brought about by pouring in 58 parts of hydrochloric acid of 30 per cent strength. The diazotization finishes very rapidly and the diazo-monoazo-compound is completely dissolved. The latter is coupled, while cooling with ice, with a solution of 41 parts of 2-(4'-aminophenyl)-amino-5-hydroxynaphthalene-7:3'-disulfonic acid rendered alkaline with sodium carbonate. When the coupling is finished sodium chloride is added to complete the precipitation, the disazo-dyestuff is separated by filtration and washed on the filter with sodium chloride solution of 15 per cent strength until the coupling component can no longer be detected.

The dyestuff is then dissolved in 1000 parts of warm water with the addition of 20 parts of sodium hydroxide solution of 30 per cent strength, and after the addition of ice and 35 parts of a

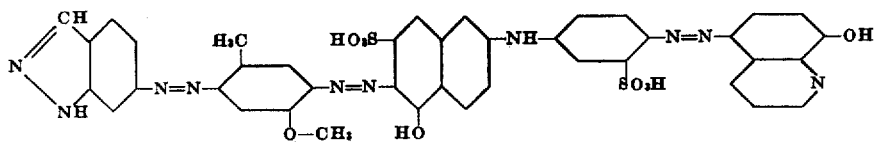

sodium nitrite solution of 20 per cent strength diazotization is brought about by pouring in 58 parts of hydrochloric acid of 30 per cent strength. The whole is stirred for a short time while cooling, any nitrite still present is decomposed with sulfaminic acid, a hydrochloric acid solution of 14.5 parts of hydroxyquinoline is added and then 60 parts of sodium carbonate dissolved in 250 parts of water are then added. The resulting trisazo-dyestuff is separated by filtration and dried. It is a black powder which dissolves in concentrated sulfuric acid with a blackish blue coloration and in water with a blue coloration, and dyes cotton by the single bath or 2-bath after-coppering process fast navy blue tints.

Very similar dyestuffs are obtained by using, instead of 2-methyl-6-aminobenzimidazole, 6-amino- or 7-amino-benzimidazole. A dyestuff yielding blackish navy blue tints is obtained by using 6-aminobenzimidazole as the initial component and 1-amino-2-hydroxy-5-methylbenzene as the first coupling component. By using the amino-naphthoimidazole of the formula

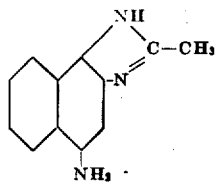

as initial component, there is obtained a dyestuff yielding greenish navy blue tints.

A valuable dyestuff yielding on cotton blackish navy blue tints when after-coppered is obtained by coupling diazotized 2-methyl-6-amino-benzimidazole with 1-amino-2-hydroxy-5-methylbenzene, diazotizing the amino-monoazo dyestuff and coupling it with 2-(4'-aminophenyl)-amino-5-hydroxynaphthalene-7,3'-sulfonic acid, diazotizing again the so obtained product and coupling it with 8-hydroxyquinoline. This dyestuff corresponds in its free acid state to the formula amino-2-methoxy-5-methylbenzene is carried out, the hydrochloric acid being neutralized with sodium acetate. Coupling finishes in a few hours. The monoazo-dyestuff is separated by filtration, dissolved in 1000 parts of cold water and 33 parts of sodium hydroxide solution of 30 per cent strength, then mixed with 36 parts of sodium nitrite solution of 20 per cent strength, and diazotization effected at about 15° C. by pouring in 76 parts of hydrochloric acid of 30 per cent strength diluted with 100 parts of water. Diazotization takes place very rapidly, and at first a clear solution is obtained and then a sandy precipitate. After stirring for about one hour, coupling is effected with a solution of 41 parts of 2-(4'-aminophenyl) - amino - 5 - hydroxynaphthalene - 7:3'-disulfonic acid containing an excess of sodium carbonate or sodium bicarbonate, while cooling with ice. When the coupling is finished, the whole is heated to about 70° C., the dyestuff is precipitated by the addition of 15 parts of sodium chloride for every 100 parts of coupling mixture, and the product is separated by filtration at about 30-35° C., that is to say, when the runnings from the filter paper have become almost colorless. The filter residue is washed with sodium chloride solution of 15 per cent strength until all the excess of coupling component has been removed. The disazo-dyestuff is dissolved at 50° C. in 2000 parts of water with the addition of 13 parts of sodium hydroxide solution of 30 per cent strength. The whole is allowed to cool, 35 parts of sodium nitrite solution of 20 per cent strength are added together with a sufficient quantity of ice to produce a temperature of about 10° C. Diazotization is then carried out by pouring in 70 parts of hydrochloric acid of 30 per cent strength which has been diluted with 100 parts of water. The whole is stirred for a few hours while cooling, the excess of nitrite is decomposed, and there are added first a hydrochloric acid solution of 14.5 parts of 8-hydroxyquinoline and then 75 parts of sodium carbonate dissolved in 240 parts of

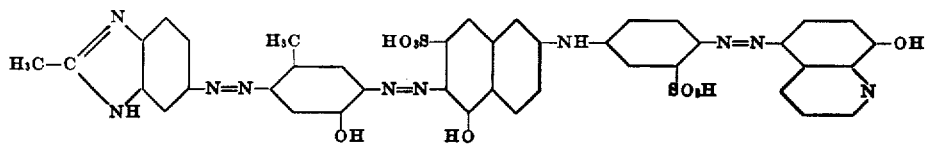

*Example 3*

13.4 parts of 6-amino-benztriazole are dissolved in 100 parts of water with the addition of 45 parts of hydrochloric acid of 30 per cent strength. Some ice is added and diazotization is carried out by pouring in 35 parts of sodium nitrite solution of 20 per cent strength. When any excess of nitrite has been decomposed, coupling with a hydrochloric acid solution of 13.7 parts of 1- water. When the coupling is finished the precipitated dyestuff which in its free acid state corresponds to the formula

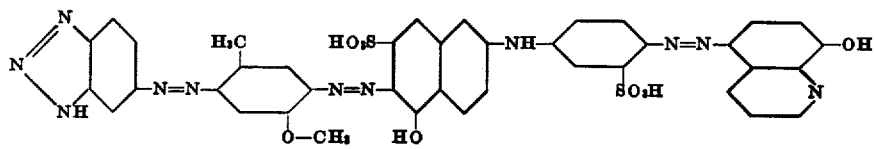

is separated by filtration and dried. It is a blackish powder which dissolves in concentrated sulfuric acid with a green-blue coloration and in water with a blue-violet coloration. It dyes cotton when after-coppered navy blue tints which are very fast to washing.

A few further dyestuffs which can be made in a similar manner are given in the following table:

| Initial component | First coupling component | Second coupling component | End component | Tint of the coppered dyeing |
|---|---|---|---|---|
| | | | | reddish navy blue. |
| | | | | blackish navy blue. |
| | | | | black-blue. |
| | | | | navy blue. |
| | | | | Do. |

The first dyestuff of the above table corresponds to the formula

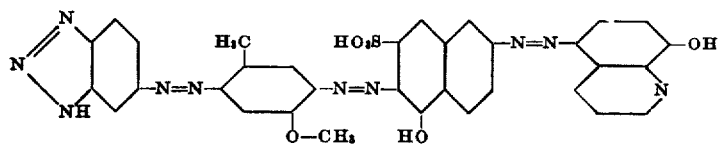

The dyestuff obtainable from 6-amino-benztriazole as initial component, 1-amino-2:5-dimethoxybenzene as first coupling component, 2-(4'-aminophenyl)-amino-5-hydroxynaphthalene-7:3'-disulfonic acid as second coupling component, and 8-hydroxyquinoline as end component (8th dyestuff of the table) corresponds to the formula

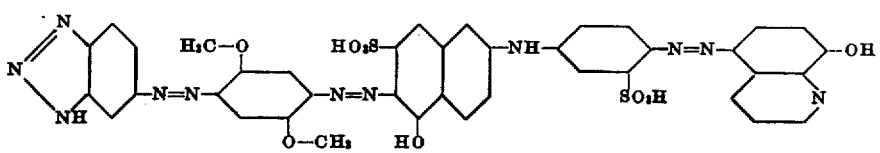

Example 4

15 parts of 6-amino-benzthiazole are dissolved in 400 parts of water and 58 parts of hydrochloric acid of 30 per cent strength, and the whole is cooled with ice to 0° C. and diazotized with 7 parts of sodium nitrite in the form of a solution of about 20 per cent strength. Coupling is then carried out with a hydrochloric acid solution of 13.7 parts of 1-amino-2-methoxy-5-methylbenzene, the hydrochloric acid being neutralized with sodium acetate. The monoazo-dyestuff is separated by filtration and washed with a dilute sodium chloride solution acidified with a small quantity of hydrochloric acid. The dyestuff is stirred in 1000 parts of water and mixed with 26 parts of sodium hydroxide solution of 30 per cent strength. To the yellow dyestuff suspension are added 7.5 parts of sodium nitrite dissolved in water and then at ordinary temperature 75 parts of hydrochloric acid of 30 per cent strength diluted with about 150 parts of water. The diazo-azo-compound, which temporarily dissolves to give a clear solution, is stirred for a short time and then coupled with 41 parts of 2-(4'-aminophenyl) - amino - 5 - hydroxynaphthalene - 7:3'-disulfonic acid in a medium rendered alkaline with sodium carbonate or sodium bicarbonate. When the coupling is finished, the disazo-dyestuff is separated by filtration, washed with a dilute sodium chloride solution and dissolved in 3000 parts of hot water. When the solution has cooled to about 30° C., it is further cooled by the addition of ice to 10-15° C., 7 parts of sodium nitrite are added in the form of a solution of 20 per cent strength, and then 58 parts of hydrochloric acid of 30 per cent strength diluted with 150 parts of water are added. The diazo compound is stirred for a few hours, the excess of nitrite is decomposed, 14.5 parts of 8-hydroxyquinoline are added in solution in hydrochloric acid and then a solution of 75 parts of sodium carbonate in 240 parts of water is added. When the coupling is finished the trisazo-dyestuff is separated by filtration, and dried. It is a blackish powder which dissolves in concentrated sulfuric acid with a blackish coloration and in water with a blue coloration, and dyes cotton when after-coppered reddish navy blue tints.

By using instead of 6-aminobenzthiazole, a corresponding quantity of 2-aminothiazole there is obtained a dyestuff yielding somewhat greener tints.

*Example 5*

100 parts of cotton are entered at 50° C. into a dyebath containing in 4000 parts of water 1.5 parts of the dyestuff obtainable as described in the first paragraph of Example 1 and 2 parts of anhydrous sodium carbonate. The temperature is raised in the course of 20 minutes to 90-95° C., 40 parts of crystalline sodium sulfate are added, and dyeing is carried on for 30 minutes at 90-100° C. The whole is then allowed to cool to about 70° C., 3 parts of complex sodium copper tartrate of approximately neutral reaction are added, coppering is carried out for ½ hour at about 80° C., and the dyeing is then rinsed with cold water. If desired, the dyeing may be soaped by after-treatment with a solution containing 5 parts of soap and 2 parts of anhydrous sodium carbonate in 1000 parts of water. A navy blue dyeing of good fastness to washing and light is obtained.

What is claimed is:

1. A trisazo dyestuff corresponding to the formula $$R_1-N=N-R_2-N=N-R_3-N=N-R_4$$

in which $R_1$ represents a heterocyclic radical containing a 5-membered hetero-ring selected from the group consisting of indazole, imidazole, triazole and thiazole rings, $R_2$ represents the radical of a middle component free from sulfonic acid groups and selected from the middle components of the benzene and naphthalene series, $R_3$ represents the radical of a 5-hydroxynaphthalene-7-sulfonic acid bound in the 6-position to the azo-group connecting $R_2$ and $R_3$, and which radical is bound in at least one of the positions 1 and 2 to the azo group connecting $R_3$ and $R_4$, and $R_4$ represents a member selected from the group consisting of the radical of an 8-hydroxyquinoline and the radical of a hydroxybenzene ortho-carboxylic acid.

2. A trisazo dyestuff corresponding to the formula $$R_1-N=N-R_2-N=N-R_3-N=N-R_4$$

in which $R_1$ represents a benzene radical of which two vicinal ring carbon atoms also form part of a triazole ring, $R_2$ represents a benzene radical free from sulfonic acid groups and containing the azo groups in para-position and containing in ortho-position to the azo group connecting $R_2$ and $R_3$ a group which is capable of taking part in the formation of metal complexes, $R_3$ represents the radical of a 5-hydroxynaphthalene-7-sulfonic acid bound in the 6-position to the azo-group connecting $R_2$ and $R_3$, and which radical is bound in at least one of the positions 1 and 2 to the azo group connecting $R_3$ and $R_4$, and $R_4$ represents the radical of an 8-hydroxyquinoline.

3. A trisazo dyestuff containing two sulfonic acid groups and corresponding to the formula

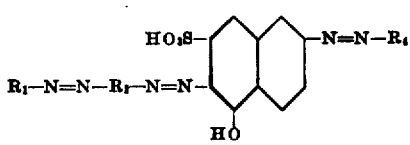

in which $R_1$ represents a benzene radical of which two vicinal ring carbon atoms also form part of a triazole ring, $R_2$ represents a benzene radical free from sulfonic acid groups and containing the azo groups in para-position and containing in ortho-position to the azo group connecting $R_2$ and the naphthalene nucleus a group which is capable of taking part in the formation of metal complexes and $R_4$ represents the radical of an 8-hydroxyquinoline bound to the azo group in 5-position.

4. A trisazo-dyestuff containing two sulfonic acid groups and corresponding to the formula

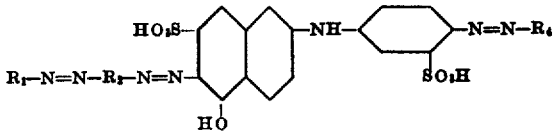

in which $R_1$ represents a benzene radical of which two vicinal ring carbon atoms also form part of a triazole ring, $R_2$ represents a benzene radical containing the azo groups in para-position and containing in ortho-position to the azo group connecting $R_2$ and the naphthalene nucleus a group which is capable of taking part in the formation of metal complexes and $R_4$ represents the radical of an 8-hydroxyquinoline bound to the azo group in 5-position.

5. The trisazo dyestuff of the formula

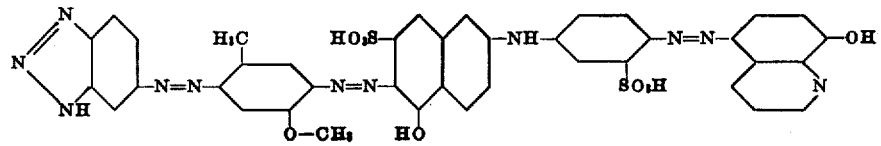

6. The trisazo dyestuff of the formula

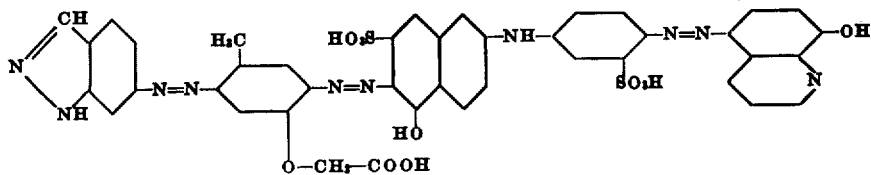

7. The trisazo dyestuff of the formula

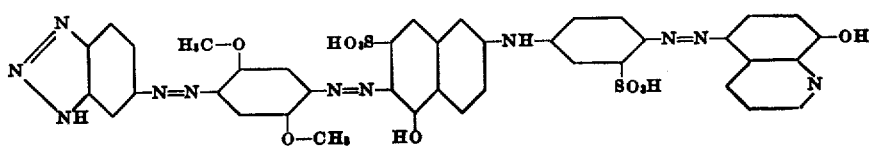

8. The trisazo dyestuff of the formula

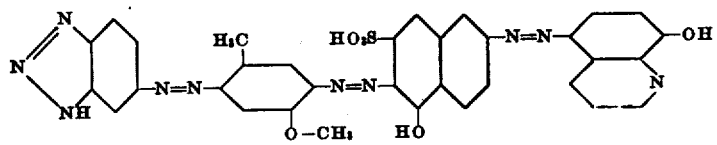

9. The trisazo dyestuff of the formula

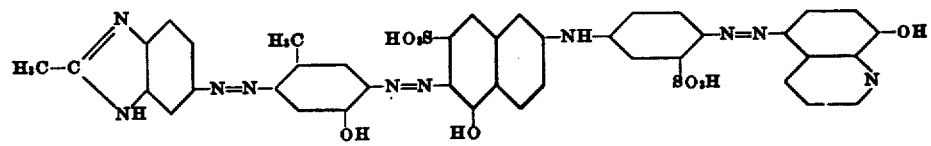

10. A trisazo dyestuff corresponding to the formula

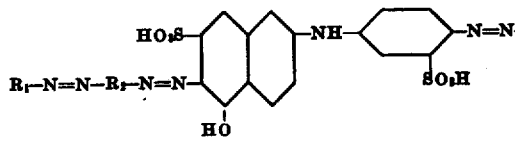

in which $R_1$ represents an indazole radical, $R_2$ represents a benzene radical containing the azo groups in para-position and containing in ortho-position to the azo group connecting $R_3$ and the naphthalene nucleus a group which is capable of taking part in the formation of metal complexes and $R_4$ represents the radical of an 8-hydroxyquinoline bound to the azo group in 5-position.

11. A trisazo dyestuff corresponding to the formula

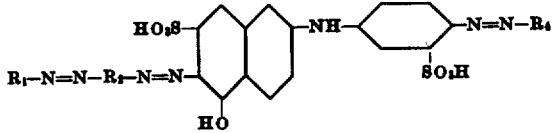

in which $R_1$ represents a benzene radical of which two vicinal ring carbon atoms also form part of an imidazole ring, $R_2$ represents a benzene radical containing the azo groups in para-position and containing in ortho-position to the azo group connecting $R_3$ and the naphthalene nucleus a group which is capable of taking part in the formation of metal complexes and $R_4$ represents the radical of an 8-hydroxyquinoline bound to the azo group in 5-position.

WALTER HANHART.

No references cited.

Certificate of Correction

Patent No. 2,671,775                                                                March 9, 1954

Walter Hanhart

It is hereby certified that error appears in the printed specification of the above numbered patent requiring correction as follows:

Column 3, the first formula at top of page, for that portion reading

line 66, for "1-aminonapthalene" read *1-aminonaphthalene*; column 4, line 61, for "3′aminophenyl" read *3′-aminophenyl*; column 8, line 36, for "whilee" read *while*; column 9, line 41, for "sulfonic" read *disulfonic*;

and that the said Letters Patent should be read as corrected above, so that the same may conform to the record of the case in the Patent Office.

Signed and sealed this 27th day of April, A. D. 1954.

[SEAL]

ARTHUR W. CROCKER,
    *Assistant Commissioner of Patents.*